United States Patent [19]

Kohnhauser

[11] Patent Number: 4,477,295

[45] Date of Patent: Oct. 16, 1984

[54] METHOD FOR FABRICATING CONVEYOR WORMS OR THE LIKE

[75] Inventor: Alexander Kohnhauser, Kapfenberg, Austria

[73] Assignee: Vereinigte Edelstahlwerke AG (VEW), Vienna, Austria

[21] Appl. No.: 408,420

[22] Filed: Aug. 16, 1982

[30] Foreign Application Priority Data

Sep. 4, 1981 [AT] Austria .................................. 3832/81

[51] Int. Cl.³ .............................................. B65G 33/08
[52] U.S. Cl. .............................. 148/11.5 Q; 148/12 E; 228/162; 228/231; 228/263.15; 198/657
[58] Field of Search ..................... 148/11.5 Q, 11.5 R, 148/131, 12 R, 12 E, 12 EA, 12.1, 127, 12 B, 12 F; 29/156.8 R, DIG. 18, 458, 505, 527.6; 228/231, 235, 243, 263 D, 126, 127, 131, 155, 159, 160, 161, 162; 198/657, 677; 75/126 E, 126 H

[56] References Cited

U.S. PATENT DOCUMENTS

| | | | |
|---|---|---|---|
| 2,003,440 | 6/1935 | Harrison | 29/156.8 R |
| 2,037,733 | 4/1936 | Mudge | 148/11.5 Q |
| 3,129,504 | 4/1964 | Ivan et al. | 29/156.8 R |
| 3,456,317 | 7/1969 | Fritsch | 228/160 |
| 3,509,617 | 5/1970 | Winter | 228/126 |
| 3,913,208 | 10/1975 | Colombi et al. | 228/131 |
| 3,998,318 | 12/1976 | McAlarney | 148/131 |

FOREIGN PATENT DOCUMENTS

| | | | |
|---|---|---|---|
| 0884908 | 8/1943 | France | 75/126 R |
| 0048005 | 5/1980 | U.S.S.R. | 148/11.5 Q |

OTHER PUBLICATIONS

"Stahlschlüssel" C. W. Wegst pp. 192 and 225.
Metals Handbook, vol. 3, 9th Ed., pp. 95, 422–423, Dec. 1980, American Soc. for Metals, Metals Park, Ohio.
Metals Handbook, vol. 4, 9th Ed., pp. 14 and 20, Nov. 1981, American Soc. for Metals, Metals Park, Ohio.

Primary Examiner—L. Dewayne Rutledge
Assistant Examiner—S. Kastler
Attorney, Agent, or Firm—Werner W. Kleeman

[57] ABSTRACT

A method of fabricating conveyor or feed worms, especially those used in plastic processing machines, containing a tough steel core and a high wear resistant plating. Initially, there is fabricated a compound metal blank by forging or hot rolling a substantially rod-shaped steel core provided with a snugly bearing sleeve or sheath formed of the plating material while forming a metallic bond between the core and the sleeve and while reducing the sleeve diameter by at least 20%. After soft annealing the blank there is formed therefrom the worm profile, and then there is accomplished a thermal treatment which entails hardening and tempering in order to set the hardness of the plating material as well as the core material, and finally there is accomplished the finished machining to the final dimensions.

6 Claims, No Drawings

METHOD FOR FABRICATING CONVEYOR WORMS OR THE LIKE

CROSS-REFERENCE TO RELATED APPLICATION

This application is related to my commonly assigned, copending U.S. application Ser. No. 394,924, filed June 24, 1982.

BACKGROUND OF THE INVENTION

The present invention relates to a new and improved method of fabricating conveyor or feed worms, especially conveyor worms or screws used in plastic processing machines, which are of the type comprising a tough steel core and a high wear resistant metal plating.

The high loads and the therewith associated pronounced wear to which, in particular, there are subjected the webs of conveyor or feed worms, has given rise to attempts to find solutions to improve the service life of such conveyor worms or screws. Thus, for instance, it is known in this art to subject the surface regions of conveyor or feed worms employed in plastic processing to a hardening treatment by techniques such as case hardening, nitriding, ion nitriding and so forth, and, in particular, to reinforce or armor the webs and, if desired, also the worm tips by applying particularly wear resistant weld deposits. While it was possible in this manner to attain a decisive improvement, nonetheless such techniques were associated with a relatively great amount of work, and, accordingly, increased fabrication costs.

SUMMARY OF THE INVENTION

Therefore, with the foregoing in mind it is a primary object of the present invention to provide a new and improved method of fabricating conveyor or feed worms in an extremely efficient, relatively simple, economical and reliable manner in order to improve the service life thereof.

Another and more specific object of the present invention aims at providing an appreciably simplified fabrication method for the production of conveyor or feed worms which especially have an enhanced longevity or service life, particularly conveyor or feed worms used in plastic processing machines.

A further important object of the present invention is directed to a novel and economically feasible method of fabricating conveyor or feed worms, especially but not exclusively those used in plastic processing machines, possessing a durable and sturdy construction and an increased service life.

DETAILED DESCRIPTION OF THE PREFERRED EMBODIMENTS

Now in order to implement these and still further objects of the invention, which will become more readily apparent as the description proceeds, the manufacturing method for conveyor or feed worms of the present development is manifested by the features that, initially there is fabricated a compound or composite metal blank by forging or hot rolling a substantially rod-shaped steel core provided with a thereat snugly contacting sleeve formed of the plating material while forming a metallic bond between the core and sleeve and while reducing the sleeve diameter by at least 20%. After soft annealing the blank there is formed the worm profile, and then such is subjected to a thermal treatment composed of hardening and tempering in order to set the hardness of the plating material as well as that of the core material, and thereafter there is accomplished the finished or final machining to the final dimensions.

According to one exemplary embodiment of the inventive method there is used as the plating material a tool steel containing 0.6–2.2% by weight C; 0.1–1.5% by weight Si; 0.1–1.5% by weight Mn; 4.8–13% by weight Cr; 0–1.5% by weight Mo; 0–1,5% by weight V; 0–1.5% by weight W, the remainder iron an unavoidable impurities.

However, it is very advantageous to also employ as the plating material a chromium steel containing 0.40–1.10% by weight C; 0.1–0.6% Si; 0.1–0.6% by weight Mn; 12–18% by weight Cr; 0.1–1.5% by weight Mo; 0.1–1.6% by weight V; 0.1–1.6% by weight Co; the remainder iron and unavoidable impurities, or a high-speed steel containing 0.6–1.5% by weight C; 0.1–1.5% by weight Si; 0.1–0.8% by weight Mn; 3.8–4.8% by weight Cr; 1.5–10% by weight Mo; 1.5–4.5% by weight V; 1.5–18% by weight W; 1.5–10% by weight Co, the remainder iron and unavoidable impurities.

There is preferably used as the core material a steel containing 0.10–0.5% by weight C; 0.3–1.8% by weight Si; 0.3–1.5% by weight Mn; 0.2–17% by weight Cr; 0–18% by weight Ni; 0.1–0.5% by weight Mo; 0–0.5% by weight V, the remainder iron and unavoidable impurities.

The dimensioning of the core and sleeve of the compound or composite metal blank is preferably undertaken as a function of whether the metal plating merely forms a part of the worm web or also should encompass the surface region of the worm or screw located between the webs or spirals.

At this point there will now be explained the invention in even greater detail based upon an exemplary embodiment.

In order to produce conveyor or feed worms for a plastic injection molding machine there is initially provided a cylindrical steel rod core formed of stainless chromium steel (German Industrial Standard No. 1.4006, comprising 0.08–0.12% C, $\leq$1.00% Si, $\leq$1.00% Mn, $\leq$0.045% P, $\leq$0.03% S and 12.00–14.00% Cr.) with an outer sheath or sleeve formed of ledeburitic chromium steel (German Industrial Standard No. 1.2080, comprising 1.90–2.20% C, 0.20–0.40% Si, 0.20–0.40% Mn, $\leq$0.035% P, $\leq$0.035% S and 11.00–12.00% Cr.). The dimensions of both parts are chosen such that after machining the confronting surfaces there is produced a tight fit. The composite body, having an external dimension of 134 mm, a wall thickness of the sleeve of 17 mm, and a length of about 1000 mm, is now welded at its two ends at the joint region in order to positively preclude the penetration of air, and then is forged at a forging temperature of 1150° C. upon a longitudinal forging machine in a number of passes while forming a metallic bond, wherein based upon the thus obtained degree of 4.25 there resulted an external diameter of 65 mm and a core diameter of 48 mm. After soft annealing there is machined from the forged composite metal blank by carrying out a metal removing machining operation the worm profile for two conveyor or feed worms of the dimension 60 by 300 mm. The height of the worm web or spiral differed; in one construction it amounted to 4 mm, resulting in a complete plating with the plating material, i.e. also the worm base located between the web coils or flights was composed of this material. In the core there was further provided a centrally located cooling agent bore of 18 mm diameter, which also explains the reason for the selection of the stainless chromium steel as the core material. With the other variant construction the pitch of the web coils or flights was the same and amounted to 50 mm; however, the height of the worm web or spiral, with this embodiment, amounted to 9.5 mm, so that only a so-called web plating was formed, and the base or root portion of the web coils or spirals as well as the base of the worm were formed of the core material. The thermal treatment of both conveyor worms or screws was undertaken by quenching at 960° C. in a salt bath which was at 230° C., and at the plating material there resulted a hardness of 64–65 $HR_c$ and at the core material a hardness of 41.5–42 $HR_c$. The tempering after the air cooling of the worm to room temperature likewise was accomplished in a salt bath which was at 230° C. and finally resulted in the following end values: plating: 60–61 $HR_c$, core: 40.5–41 $HR_c$.

The conveyor or feed worms fabricated to the final dimensions by the finish machining operation gave outstanding results in practical operations.

For the selection of the material combinations composed of the plating material and the core material, depending upon the conditions of use of the conveyor worms and the fact that the thermal treatment is particularly accommodated to obtaining the desired hardness of the plating material, but at the same time also should ensure that there is attained for the core material the desired degree of hardness and toughness, there is afforded a multiplicity of possibilities, and the proposed new technology enables finding, in each instance, an optimum in order to realize an outstanding service life with comparatively low fabrication costs.

While there have been described present preferred embodiments of the invention, it is to be distinctly understood that the invention is not limited thereto, but may be otherwise variously embodied and practiced within the scope of the following claims. Accordingly,

What I claim is:

1. A method of fabricating conveyor worms containing a steel core and a high wear resistant plating comprising the steps of:
    fabricating a compound metal blank by forging or hot rolling a substantially rod-shaped steel core provided with a snugly bearing sleeve formed of high wear resistant plating material while forming a metallic bond between the core and the sleeve and while reducing the sleeve diameter by at least 20%;
    soft annealing the blank and then forming the worm profile by a machining operation;
    then carrying out a thermal treatment composed of hardening and tempering in order to set the hardness of the plating material and that of the core material; and
    then accomplishing a finished machining operation to obtain desired final dimensions of the conveyor worm.

2. The method as defined in claim 1, further including the steps of:
    using as the plating material a tool steel containing 0.6–2.2% by weight C; 0.1–1.5% by weight Si; 0.1–1.5% by weight Mn; 4.8–13% by weight Cr; 0–1.5% by weight Mo; 0–1.5% by weight V; 0–1,5% by weight W, the remainder iron and unavoidable impurities.

3. The method as defined in claim 1, further including the steps of:
    using as the plating material a chromium steel containing 0.40–1.10% by weight C; 0.1–0.6% Si; 0.1–0.6% by weight Mn; 12–18% by weight Cr; 0.1–1.5% by weight Mo; 0.1–1.6% by weight V; 0.1–1.6% by weight Co; the remainder iron and unavoidable impurities.

4. The method as defined in claim 1, further including the step of:
    using as the plating material a high-speed steel containing 0.6–1.5% by weight C; 0.1–1.5% by weight Si; 0.1–0.8% by weight Mn; 3.8–4.8% by weight Cr; 1.5–10% by weight Mo; 1.5–4.5% by weight V; 1.5–18% by weight W; 1.5–10% by weight Co, the remainder iron and unavoidable impurities.

5. The method as defined in claim 1, further including the step of:
    using as the core material a steel containing 0.10–0.5% by weight C; 0.3–1.8% by weight Si; 0.3–1.5% by weight Mn; 0.2–17% by weight Cr; 0–18% by weight Ni; 0.1–0.5% by weight Mo; 0–0.5% by weight V, the remainder iron and unavoidable impurities.

6. The method as defined in claim 1, further including the step of:
    undertaking a thickness dimensioning of the core and the sleeve of the compound metal blank as a function of whether the plating should form merely a part of a worm spiral or also should encompass a surface region of the worm disposed between the worm spirals.

* * * * *